US006208955B1

(12) United States Patent
Provan et al.

(10) Patent No.: US 6,208,955 B1
(45) Date of Patent: Mar. 27, 2001

(54) DISTRIBUTED MAINTENANCE SYSTEM BASED ON CAUSAL NETWORKS

(75) Inventors: Gregory M. Provan, Newbury Park, CA (US); Charles J. Sitter, Robins, IA (US)

(73) Assignee: Rockwell Science Center, LLC, Thousand Oaks, CA (US)

( * ) Notice: Subject to any disclaimer, the term of this patent is extended or adjusted under 35 U.S.C. 154(b) by 0 days.

(21) Appl. No.: 09/097,206

(22) Filed: Jun. 12, 1998

(51) Int. Cl.[7] .................................................. G06F 9/45
(52) U.S. Cl. ................... 703/20; 703/27; 714/26; 709/201
(58) Field of Search ................... 703/16, 2, 27, 703/20; 706/47, 20, 60, 45, 52, 26; 714/739, 26; 707/104; 712/28; 701/14, 35; 709/213, 201

(56) References Cited

U.S. PATENT DOCUMENTS

| 5,018,075 | * | 5/1991 | Ryan et al. | 364/513 |
| 5,493,729 | * | 2/1996 | Nigawara et al. | 395/61 |
| 5,544,308 | * | 8/1996 | Giordano et al. | 395/183.02 |
| 5,704,017 | * | 12/1997 | Heckerman et al. | 395/61 |
| 5,822,745 | * | 10/1998 | Hekmatpour | 706/59 |
| 5,963,447 | * | 10/1999 | Kohn et al. | 364/148.04 |

OTHER PUBLICATIONS

Davis et al., "Knowledge–Based Diagnostic System for Avionics," IEEE, pp. 73–8, 1992.*
Adnan Darwiche and Gregory Provan, "Implementing Belief–network inference in Real–World Systems," Proceedings of the 12th Annual Conference on Uncertainty in AI. Portland, Oregon, pp. 203–210, (Aug. 13, 1996).

* cited by examiner

Primary Examiner—Kevin J. Teska
Assistant Examiner—Thai Phan
(74) Attorney, Agent, or Firm—Craig E. Shinners

(57) ABSTRACT

The present invention relates to a diagnostic system for complex systems such as avionics systems. The diagnostic system acquires a description of the system from a variety of design tools and creates a causal network model as an intermediate step. From the causal network model, the diagnostic system builds and compiles a Q-DAG model of the system, which is then embedded in the central maintenance computer of the aircraft. The present invention integrates two elements, a graphical user interface (GUI), which acts as a data capture tool and graphical display of the avionics system and an inference system, which acts as a diagnostic tool with a presenter. The presenter permits diagnosis of faulty sub-systems and a report may be relayed to remotely located maintenance crews to minimize repair time upon arrival of the aircraft.

30 Claims, 9 Drawing Sheets

| | | |
|---|---|---|
| | EASIER 1020 | |
| CDIF Servants 1014 | Causal Nets 1016 | Applesauce 1018 |
| CDIF Core 1012 | | Java 1.1 AWT |
| CDIF Stubs From CDIF.IDL 1010 | | |

FIGURE 10

DISTRIBUTED MAINTENANCE SYSTEM BASED ON CAUSAL NETWORKS

BACKGROUND OF THE INVENTION (1) Field of the Invention

The present invention relates to a diagnostics system and more particularly to an enterprise diagnostic system, based on distributed objects and Internet Inter-ORB protocol (IIOP), for diagnosing faults in avionics systems.

(2) Description of Related Art

Explosive growth in technology has made possible increasingly complex avionics systems for use in aviation, missilery and astronautics. In particular, the development of electrical and electronic devices have ushered in an era where avionics systems now assist the flight crew in virtually every aspect of operating modern aircraft.

Reliable operation of the aircraft therefore depends on avionics systems that not only perform their intended functions but are also reliable. In operation, however, vibration, rapid attitude changes, rapid environmental changes and other similar influences can affect performance and reliability of the avionics system. By way of example, the avionics system may include electrical and electronic sub-systems having an intended use in communications, navigation, aircraft control, remote sensing (such as the amount of on-board fuel), wiring and power distribution, life support, electronic warfare equipment (in military aircraft and missilery) and various sensors that provide vital real-time information. Accordingly, those concerned with flying and maintaining the aircraft, in particular, require methods of verifying the correct operation of the avionics systems both in-flight and during maintenance periods. For this reason modem aircraft include a real-time diagnostic system to monitor the avionics and other systems.

It will be appreciated that system level diagnostics of avionics systems are necessarily complex especially in view of the potential for interaction between the various sub-systems. Due to this interaction and complexity, diagnostic capability has, in the past, been tightly coupled to the system definition. This tight coupling makes it difficult to improve or upgrade the diagnostic system thereby rendering prior art diagnostic systems obsolete as the avionics system is improved. Accordingly, there is a great need to provide a method for updating diagnostic systems concurrently with the improvement or upgrade of the avionics system in an efficient and inexpensive manner.

Modern commercial aircraft (such as the Boeing 747 and the Boeing 777 models provided by the Boeing Company) include diagnostic systems based around a central maintenance computer (CMC). This system collects, processes and evaluates avionics system information to verify normal operation by comparing sensor inputs against pre-defined rules to detect operational failures.

For example, the diagnostic system on the Boeing 747-400 aircraft uses loosely structured Boolean logic equations to perform its diagnostic evaluation. The primary disadvantage of this diagnostic system stems from the complexity of the rules (i.e., logic equations) and the difficulties engineers have in maintaining the rules over the life of the aircraft. Another disadvantage suffered using this approach is that diagnostic accuracy is limited by lack of standards for the various sub-systems that comprise the avionics system and by lack of large-scale system simulation capability. Unfortunately, even though the implementation of the diagnostic system on the 747-400 took a significant amount of time and expense to mature, its adaptation or implementation on other aircraft is not possible. Thus, this time and expense must be incurred for each type or model of aircraft. Further, upgrades or additions to the avionics system during the life of the aircraft often require additional expensive and time-consuming effort to update the model to reflect the changes to the diagnostic system.

To overcome the problems associated with the above-described diagnostic system, the Boeing 777 aircraft adopted a shallow model-based approach based on a simple relational database structure. This diagnostic system segments the primary diagnostic functions such as signal validation, cascade-effect removal and fault isolation and correlation into a series of sequentially processed tasks. This approach, however, is limited since the shallow low-fidelity model paradigm focuses on reporting faults rather than evaluating physical system-level failure characteristics. Further, this model-based approach does not easily support analysis of the complex relationships among fault signals.

Another shortcoming of the Boeing 777 diagnostic system is that it is text based. Thus, it offers very limited design or analysis capability and offers no simulation capability. Further still, this diagnostic system offers only limited fault coverage leading to large ambiguity groups and "no fault found" conditions for line replaceable units (LRUs) pulled from the aircraft during the repair effort.

If changes are made to the avionics systems, both of the diagnostic systems described above must regenerate an entirely new model or set of rules, an expensive and technically demanding process. Traditional avionics system diagnostic system architecture tightly couples diagnostic interfaces (such as graphic displays, control panels, sensor inputs, keyboards) data storage and retrieval, and the application code in a single black box. This architecture provides for a focused diagnostic system that meets the diagnostic requirements of one avionics system. However, such diagnostic systems are difficult to modify, expand or upgrade since it requires detailed knowledge of the entire avionics system. Further, the process of modifying the model or amending the rules to incorporate the changes to the avionics system is a non-trivial task that is time consuming, expensive and susceptible to error. Further still, such diagnostic systems do not provide any system level visibility of how sub-systems work together so it is difficult for pilots and ground crew to visualize the overall system and the inter-relationship of the various sub-systems. This lack of system level visibility makes trouble shooting unnecessarily complicated, expensive and time consuming.

Few current diagnostic systems provide the capability to model an avionics system on a system level incorporating the design of various sub-systems from many different manufacturers into a cohesive model. Further, no current diagnostic system provides the capability to perform detailed simulation and diagnostic testing of the avionics system to guarantee rapid generation of a rule set that fully defines all potential failure modes. Further still, no current diagnostic system provides real-time diagnostic inference of avionics system failure in a visual manner so that the inter-relationship between various sub-systems is readily apparent to both the flight crew and a ground based maintenance crew. Thus, whatever the merits of the above described prior art diagnostic systems for avionics systems, they do not achieve the benefits of the present invention. Clearly, what is needed is a diagnostic system for avionics systems that provides greater flexibility, expansion, and maintainability than prior art solutions. What is also needed is a user-friendly system for modeling the interaction of the various sub-systems comprising an avionics system and for diagnosing system failure modes based on this model. Further, since the available memory and diagnostic computing power is typically limited on board an aircraft, it is desirable that the diagnostic system consume a minimum of computer resources while at the same time providing full coverage of the potential failure modes of the avionics system.

SUMMARY OF THE INVENTION

The present invention relates to a diagnostic system for avionics systems. The diagnostic system is tailored to aircraft applications and has diagnostics, evaluation and presentation capabilities linked by an Internet Inter-ORB protocol (IIOP) communication backbone. The diagnostic system comprises a distributed development system and an on-board evaluation system.

The development system provides the tools for developing a model representative of the avionics system. Using this model, a designer or engineer may readily perform system level simulation to study operation of the entire avionics system or selected sub-systems. In the present invention, the development system includes a graphical user interface (GUI) for data capture during the building of a system level representation or model and for visually identifying failure sources in said avionics system during simulation. More specifically, the system level model of the avionics system is developed using the graphical user interface to import data by either schematic or data capture techniques or by obtaining the data directly from third party software development tools.

When the correctness of the model is assured through simulation, the development system of the present invention further provides the capability to introduce faults and to test the model from a diagnostic perspective. More particularly, the development system develops a forward-looking model to simulate the relevant operational behavior of the system under normal conditions and then extends the model to provide possible failure modes by investigating and combining various failure modes of each sub-system.

Using these capabilities, a causal network model is developed based on the behavioral characteristics of the various sub-systems comprising the avionics system. This causal network model is then compiled to obtain a query directed acyclic graph (Q-DAG) which is embedded in the on-board evaluation system.

By defining normal and faulty behavior of the individual sub-systems, a diagnostic model is generated that provides a high degree of fault coverage while using a minimum of system resources. In the event of a fault in the avionics system, the present invention graphically identifies the sub-system and preferably the faulty line replaceable unit (LRU). The diagnostic system provides two levels of diagnostic reports if failures are detected. A first level error indicates that there is a serious failure that must be immediately forwarded to the flight deck. A second level error is retained in memory associated with the evaluation system and transmitted to the maintenance ground crew. In general, diagnostic information is transmitted to one or more presenters that graphically display a representation of the avionics system and diagnostic inference identifying the faulty LRU in the event of a fault. The presenters may be on-board the aircraft or ground-based in locations remote from the aircraft.

Advantageously, with the present invention, an engineering-level representation of each sub-system and its relationship to the overall avionics system is graphically displayed showing fault locations at a level of abstraction readily comprehended by humans.

Updates or other modifications to the avionics system are readily adapted and implemented in the model representation of the avionics system. Further, the present diagnostic system retains the ability to simulate individual sub-systems as well as the overall avionics system for both nominal operational conditions and for various failure models. Thus, the diagnostic system is quickly and inexpensively updated to match upgrades or modification to the avionics system.

The present invention utilizes a distributed maintenance architecture based on open system standards to reduce costs for developing, upgrading and extending the onboard maintenance system. The present invention provides flexible reasoning methods, data collection and concentration mechanisms, on-board diagnostic reasoning, and a maintenance display platform. Additional benefits are improved responsiveness, throughput and extensibility. Using a distributed system allows for functions to reside on multiple computer platforms. The well-defined object interface allows loading on the computer resources unit to be shared over a network, as well as to dynamically change the distribution of tasks for better load sharing and redundancy management. Individual components of the avionics system can be upgraded without affecting the other components. Further, if necessary, additional functional objects can be added to the open system to allow for unplanned options to be incorporated with less risk and cost than previous maintenance systems could provide.

These and other advantages of the present invention not specifically described above will become clear within the detailed discussion herein.

BRIEF DESCRIPTION OF THE DRAWINGS

FIG. 10 further illustrates components of the graphical viewer of FIG. 9.

DETAILED DESCRIPTION OF THE INVENTION

In the following description of the preferred embodiment, reference is made to the accompanying drawings, which form a part hereof, and in which is shown by way of illustration a specific embodiment in which the invention may be practiced with respect to avionics systems. It will be apparent to one skilled in the art that the present invention may be practiced on complex electro-mechanical systems in addition to avionics systems. In the following description, numerous specific details are set forth in order to provide a thorough understanding of the present invention. It will also be apparent, however, to one skilled in the art that the present invention may be practiced without these specific details. In other instances, well-known structures and techniques have not been shown or discussed in detail to avoid unnecessarily obscuring the present invention. Reference will now be made in detail to the preferred embodiments of the invention, examples of which are illustrated in the accompanying drawings.

Figure 1:
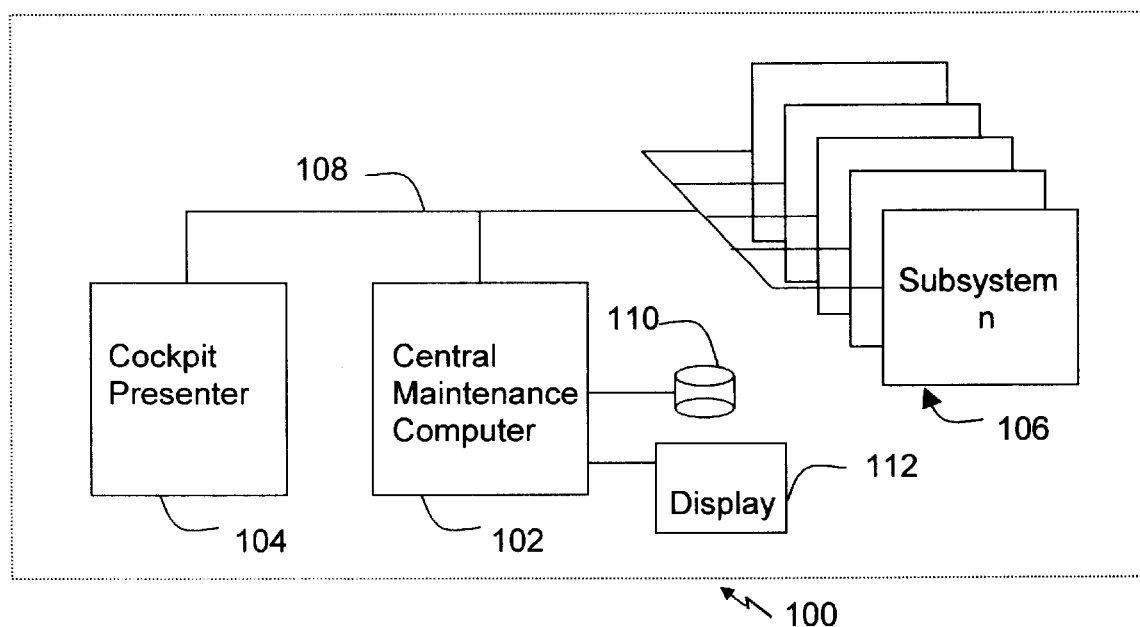
FIG. 1 illustrates a diagnostic system for an avionics system.

Referring to FIG. 1, a representative avionics system 100 is illustrated. Avionics system 100, as implemented on an aircraft, may include a central maintenance computer (CMC) 102, flight deck presenter 104 and a plurality of sub-systems 106. A system bus (or buses) 108 couples CMC 102 to sub-systems 106 and to flight deck presenter 104.

Presenter 104, in one embodiment, is a video display monitor capable of displaying text and graphical images in a variety of colors. Various peripheral devices, such as a printer and input devices, such as a keyboard or a mouse, may be associated with presenter 104. In addition to presenter 104, the flight deck includes a plurality of subsystem 106 including a flight computer, a variety of display units for displaying flight parameters, control devices for adjusting flight parameters, as well as various navigational and communication devices for use by the flight crew. Each instrument, display, control element and the flight computer may be paired with one or more redundant backup instruments, displays, control elements or computers to ensure safe operation of the aircraft in the event of failure during operation of the aircraft.

Sub-systems 106 also include, by way of example, sensors, communications, navigation, processors, controls, displays, instruments, antennas, electronic warfare equipment, interface devices, electronic data bases, power distribution support systems and devices. Other sub-systems 106 include engines, mechanical elements such as flaps, rudders, linkages, landing gear and the hydraulic system and any other sub-system that may be deemed desirable for inclusion on an aircraft. One familiar with aircraft operation will appreciate that each sub-system 106 will include a plurality of modular line replaceable units (LRUs). When a particular sub-system fails, the diagnostic system of the present invention will identify one or more LRUs most likely to have caused the failure condition. Thus, maintenance crews need only identify the faulty LRU and need not troubleshoot the failure to the component level.

CMC 102 receives state variables defining the operational state of the various sub-systems 106. CMC 102 may, in some embodiments, be part of the flight computer or tasked to perform other functions (such as navigation) rather than a computer processor dedicated to monitoring the operational state of sub-systems 106. As such, the diagnostic system of the present invention must be efficient in terms of CPU usage and memory requirements. CMC 102 includes a computer processor, program memory, input means for receiving operational or performance data from sub-systems 106 and input devices such as a keyboard and/or a mouse, a joystick (not shown). CMC 102 also preferably includes a magnetic or optical storage/retrieval device 110 such as disk drive or CD ROM drive and an on-board visual display unit 112 such as a liquid crystal display (LCD) or a video (CRT) display. In the preferred embodiment, display unit 112 displays both text and graphical information in color. In the illustrated embodiment, CMC 102 obtains real-time information from sensors (not shown) associated with each sub-system 106 and converts such information to state variables.

Figure 2:
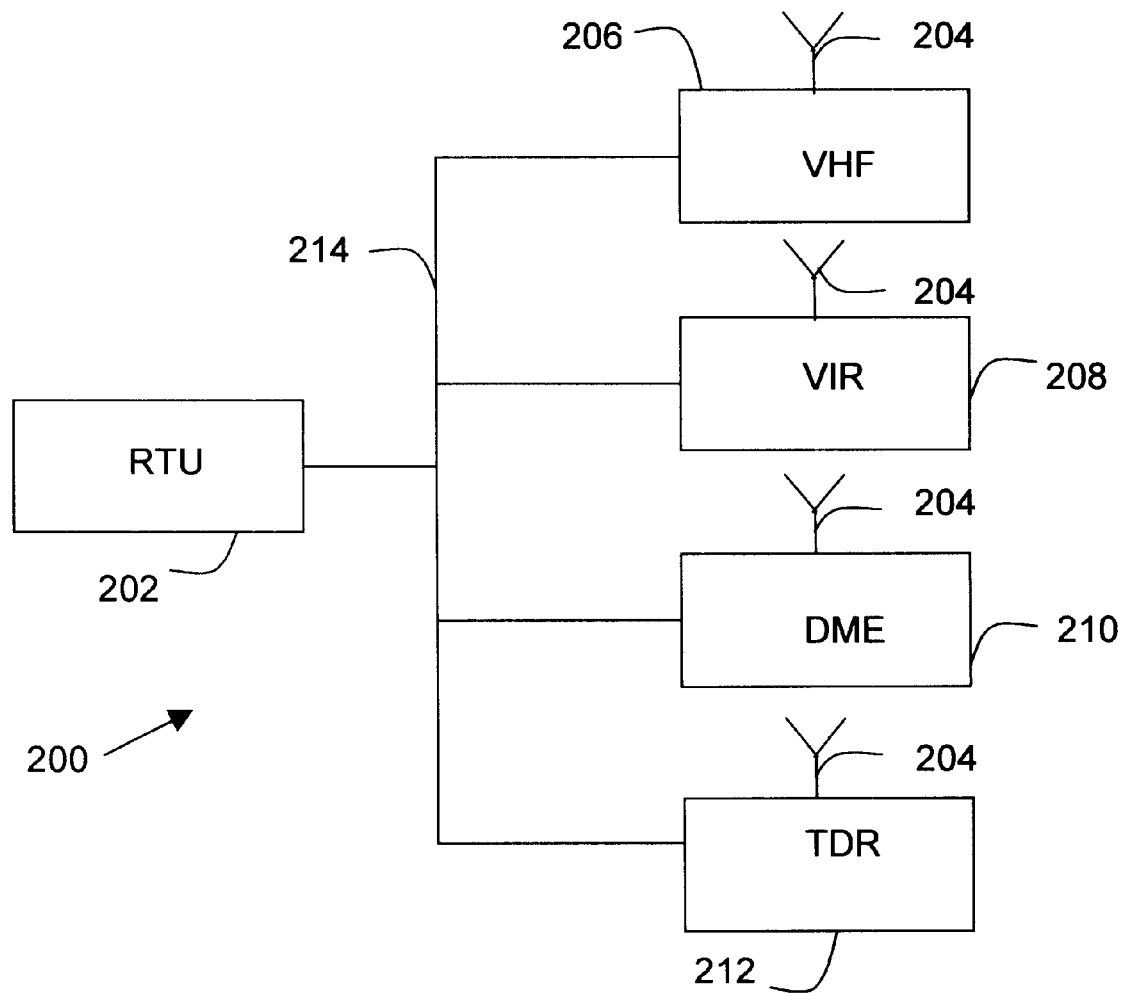
FIG. 2 illustrates a representative avionics sub-system.

FIG. 2 illustrates, by way of example, one embodiment of a representative sub-system 106; specifically, a communication sub-system 200 such as may be implemented on an aircraft. In communication sub-system 200, antennas 204 receive and transmit radio frequency information to a plurality of specialized units, such as VHF receiver 206, VIR receiver 208 and navigational instruments DME 210 and TDR 212. These units 206–212 interface with radio tuning unit (tuner) 202 over a bus 214.

In operation, information from tuner 202 is transferred to units 206–212 to select transmission and reception frequencies and operation. At various times, units 206–212 transmit and/or receive information that is relayed to tuner 202 over bus 214. However, if an error is detected in communication sub-system 200 (for example, no information is being received on-board the aircraft), it could be manifested as a failure of tuner 202 or one of the units 206–212, by a short or open bus connection, by a loss of power, by loss of antennas 204 or by a combination of two or more of failures modes. As described more fully below, the embedded Q-DAG files provides the diagnostic inferences necessary to identify the source of the error and identify the LRU that should be replaced to restore operation.

Figure 3:
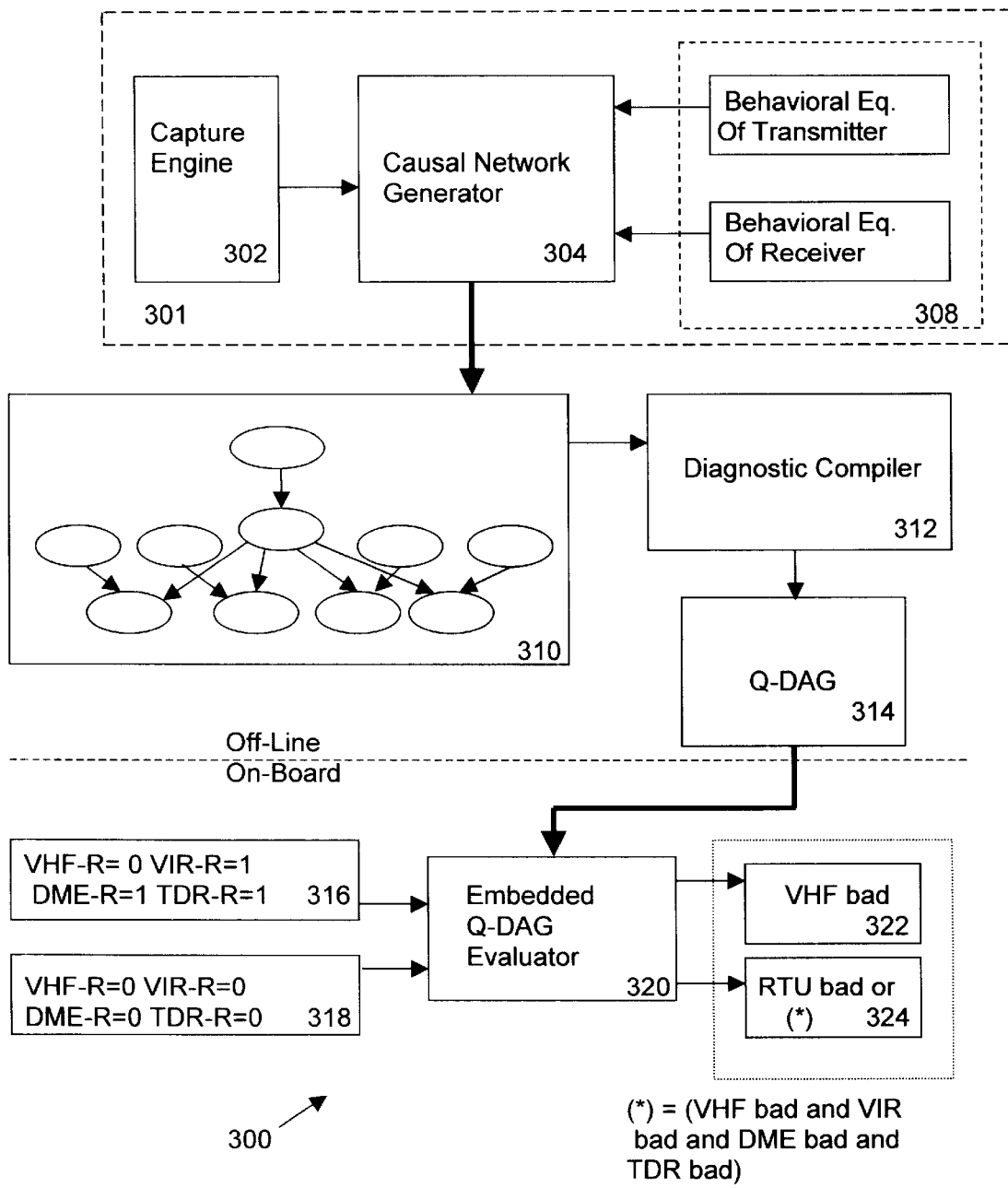
FIG. 3 is an exemplary diagnostic system for employing the computer-implemented method of the present invention for implementing a diagnostic system using Q-DAG models to identify system failures.

Referring now to FIG. 3, a representation or model of the communication sub-system 200 as well as other sub-systems 106 comprising avionics system 100 is developed by diagnostic system 300 in accordance with the present invention. More particularly, diagnostic system 300 develops a model of each sub-system 106 and the bus structure between such sub-systems and CMC 102, applies causal network inferences to the model, generates a causal network representation that is based on behavioral characteristics of the sub-systems 106 and compiles this representation into a set of Q-DAG files stored in memory 314.

To develop the model, a data capture means 301 provides a graphical design interface for the capture of system level block diagrams and for analysis, simulation and integration. Data capture means 301 includes a schematic capture engine 302 that enables development of a schematic view of avionics system 100. The schematic or process description is input by manual means (i.e., selecting primitives or composite objects from a library) or automatically captured from a database or third party design tools.

With manual input, database repositories or libraries 308 provide a plurality of primitives and compound objects (not shown) designed specifically for the avionics system domain. Libraries 308 provide behavioral equations describing the various primitives. Depending on the level specified, the primitive object can be a gate, a bus, or a complex LRU. Compound objects can be built from the available primitive objects. As shown in FIG. 3, the behavioral equations describing a particular compound object, such as the transmitter or the receiver, are selected from the library. Once built, the compound object may be stored in the libraries 308 for archival purposes. The schematic is developed by selecting instances of primitives and compound objects from a workspace palette associated with schematic capture engine 302 and connecting each primitive with buses or wires to define the avionics system.

The primitives, maintained in library 308, are customized to achieve a diagnostic "view" for each primitive in avionics system 100. Information, such as failure characteristics or system variables, relevant to the diagnostic view is obtained from the design tool either during the schematic capture process or by customized programming based on real-world observation. Advantageously, by eliminating the need to model general functional characteristics not related to diagnostics, the process of building, customizing and maintaining library 308 may be greatly simplified.

When schematic capture is acquired from third party system modeling tools, data capture means 301 uses the CASE Data Interchange Format (CDIF). CDIF is the preferred enabling technology for exchanging data between various incompatible design tools (for example, I-Logix's Statemate, ObjecTime's ObjecTime, Rockwell/Collin's ASDD) and data capture means 301. In this manner, data exchange is possible on a system level even though most such design tools have proprietary formats and databases underneath their tools. CDIF defines a single architecture for exchanging data between modeling tools and database repositories or libraries 308 or other CDIF conformant tools. The CDIF Division of the industry standards committee, EIA, defines the CDIF specification and such specification must support causal network models for the exchange of data between causal network models and design tools.

Once defined, the schematic model is passed to a causal network generator 304 that develops a causal network system model based on behavioral characteristics. A casual network system model is a graphical representation of the cause-effect relationship between sub-systems 106 coupled with a database that describes the individual behavior of each component of the sub-system in terms of inputs and outputs. These behavioral characteristics describe how the modeled sub-system or the entire system is supposed to work under normal circumstances. Potential failure modes are simulated with the model and included in the casual network model.

Figure 4:
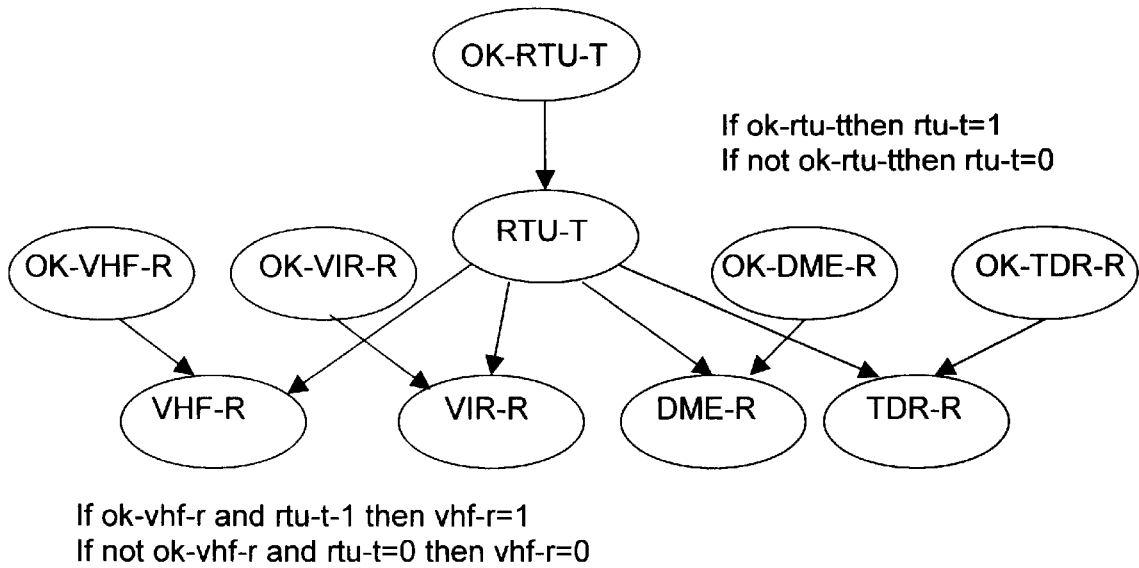
FIG. 4 illustrates a causal network model of the representative avionics sub-system shown in FIG. 2.

FIG. 4 illustrates one possible simplified Boolean causal network model 400 for the system shown in FIG. 2. Model 400 shows the quantitative network aspects (i.e., cause and effect relationships between nodes and parents which may either be Boolean logic or conditional probabilities description) based on the architecture of the underlying system (i.e., buses, LRUs, bus receivers and transmitters, monitors etc.) as well as data flow information. As will be appreciated by one skilled in the art, the causal network model provides a ranked set of diagnoses for troubleshooting failures (such as a "dead" subsystem) or faulty conditions (such as a timing related failure) of communication system 200.

Referring again to FIG. 3, the Boolean causal network model 400 of FIG. 4 is output from generator 304 and passed to a traditional causal network inference system (CNETS) 310 such as HUGIN commercially available from Hugin Expert A/S of Aalborg, Denmark (see also www.hugin.com). This causal network contains the required structures and algorithms for developing causal network inference to be associated with the causal network model. CNETS 310 performs a domain-independent causal network inference mapping logical equations into causal network properties for each primitive. These logical equations can be either very simple or rather complex since CNETS 310 supports both Boolean logic and conditional probability quantitative relationships for modeling primitive reliabilities.

CNETS compiles a representation that can be used for simulation and diagnosis. The simulation capability is critical to diagnosis, as the system needs to be able to compare normal behavior with actual input data in order to determine if a fault is present. To enable the simulation capability, a "control causal network" input as distinct from a "machine capabilities causal network" is needed. The control causal network specifies the system as if composed only of the control variables described in the system model. Note that this specification defines the normal behavior of the system, as well as the behavior of the individual sub-systems in a faulty state. The machine capabilities causal network defines the behavior of the non-control (or unobservable) variables in the system.

The causal network framework allows the user to select a LRU for which diagnostic information is desired by defining an "assumable" associated with this LRU. An assumable is a variable that explicitly specifies the failure modes (i.e., the ways in which a selected LRU can be broken, such as a bus being open or shorted). If no assumable is defined, then the network can be used for system simulation. Adding an assumable to the model for the selected LRU means the diagnostic system 300 can diagnose down to the selected LRU.

Figure 5:
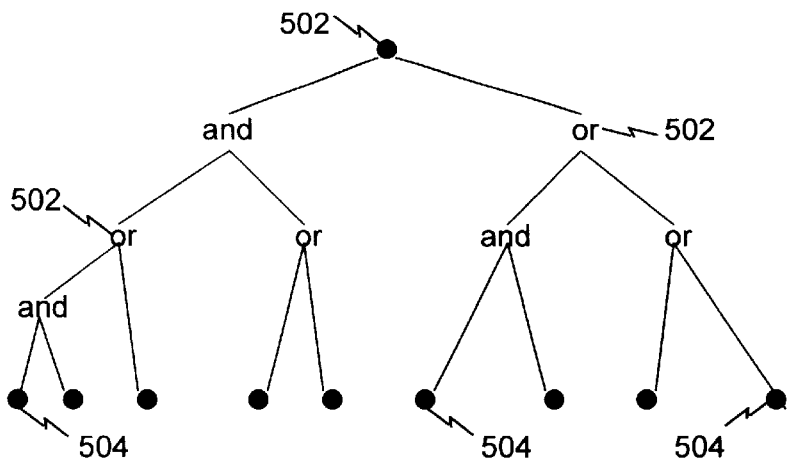
FIG. 5 illustrates a Q-DAG model of the causal network model of FIG. 4.

When the causal network inference modeling process is complete, the model is passed to a diagnostic compiler 312. Diagnostic compiler 312 generates a compiled diagnostic code referred to as a "query directed acyclic graph" or Q-DAG such as is illustrated in FIG. 5. A Q-DAG is a Boolean expression that contains all possible diagnoses for avionics system 100 given inputs of the observable variables of the system. Each non-leaf node, such as indicated at 502, represents a numeric operation, a number or a symbol for a node that depends on available evidence. Each leaf node, such as indicated at 504, of a Q-DAG represents the answer to a network query, that is, the probability of some event of interest.

Q-DAG generation is based on traditional algorithms for exact belief network inference as discussed in a paper by Gregory Provan, a joint inventor of the present application, and Adnan Darwiche, published in the Conference on Uncertainty in Artificial Intelligence, August 1996 at pp.203–210, the disclosure of which is hereby incorporated herein.

The Q-DAG implementation is structured as an m-ary tree (where a node has m children). Separate parent and children arrays are used to store the list of parent and children nodes for each of the Q-DAG nodes. The Q-DAG nodes have pointers into these arrays that specify the beginning and the ending position of their respective parent and children lists. The Q-DAG allows the use of a memory efficient evaluator to reduce processor and memory requirements, as compared to storing and loading the causal network model of FIG. 4 and CNETS software onto CMC 102.

This Q-DAG tree is then embedded in diagnostic evaluator 320. In one preferred embodiment, evaluator 320 is a diagnostic engine resident in the memory of CMC 102. Q-DAG evaluation is performed by CMC 102 in accordance with the process specified by evaluator 320. System state variables are obtained at inputs 316 and 318 and are passed in real time to evaluator 320. Evaluator 320 filters these inputs through the Q-DAG tree and generates a failure report listing possible faulty sub-systems, as shown at 322 and 324. The failure report is accessible at either display 112 or as an electronic report on storage/retrieval device 110 (FIG. 1) for access by ground crew during maintenance periods.

One advantage of the present invention is the automatic generation of a diagnostic rule set as the Q-DAG model is developed. Specifically, in a Boolean causal network, the rule database (maintained in libraries 308 of FIG. 3) consists of rules that define the local behavior of each of the primitives in terms of the inputs and outputs. Based on propositional calculus, an if-then rule of the form "If x, then y" is equivalent to the Boolean equation "(not x) or y" so it is possible to convert the rules database into Boolean equations. These Boolean equations can be manipulated and converted back into rules that only contain information about the health of the primitive in the "then" part of the rule. By combining the theory of causal networks with Boolean calculus, it is possible to automatically generate a set of diagnostic rules from a causal network structured system description.

Figure 6:
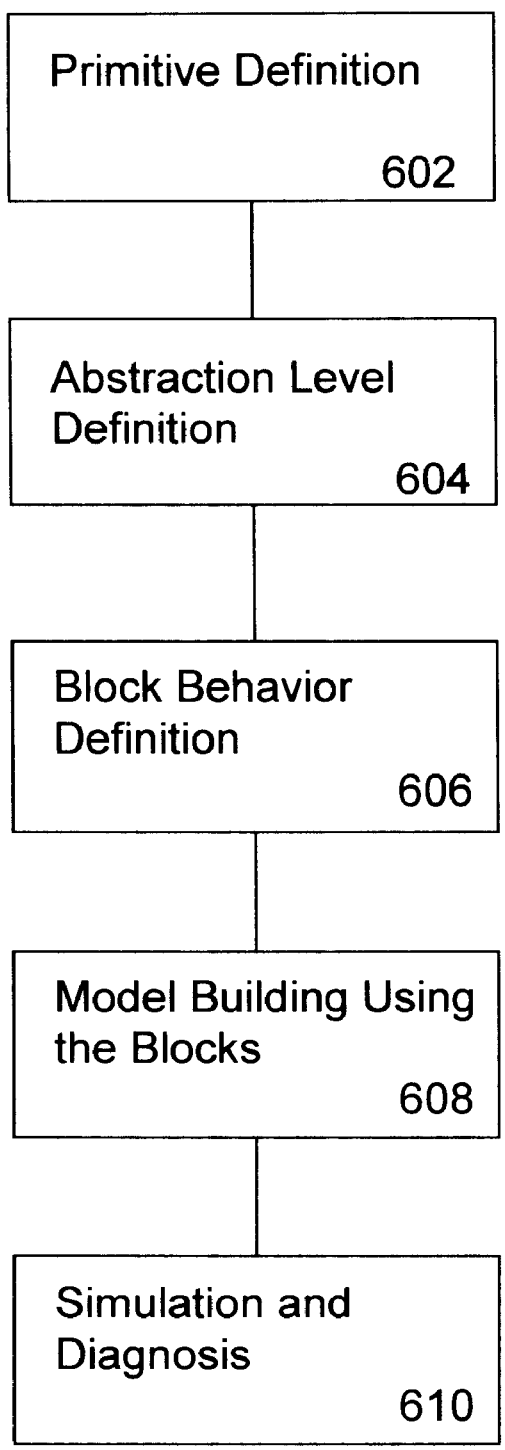
FIG. 6 is a flow diagram for implementing steps of the method of the present invention for performing diagnostics on the avionics system of FIG. 1.

FIG. 6 illustrates the modeling process in greater detail. First, as shown at step 602, primitive building blocks are defined with the desired level of modeling detail and stored in library 308. The building blocks are based on the schematic developed by schematic capture engine 302 which in most embodiments Will correspond to the LRU level description of sub-systems 106 together with interconnection information such as bus configurations, wires and switches. If known, critical sub-LRU level components and fault data flow are also included at step 602.

Since low-level real-time data flow (for example, current or voltage levels) through the LRUs, buses, wires or switch is not visible in diagnostic system 300, only fault reports and flight deck effects (FDEs) will be reported to CMC 102. CMC 102 has no knowledge about any specific monitor block or data value that triggered a fault report. Thus, the only conclusion when an apparent failure mode is detected is that a possible failure has occurred inside one of the LRUs or on a bus, wire or switch. It is an advantageous feature of the present invention that low-level real-time data need not be evaluated and need not be acquired by the diagnostic system.

In step 604, an abstraction level model of the state of all data flowing in the avionics system 100 is made. This model assumes that each block is either an "active" state defining either an active failure or fault report or an "inactive" state representing valid data. Also, since diagnosing to the internal LRU component that caused the failure is not important for ground maintenance crew, the diagnostic model is further simplified by defining generic failure source blocks to be used rather than detailed modeling at the component level. These generic failure source blocks become the lowest level of abstraction to be modeled. In most applications only the modeled generic failure source blocks, bus failures and wire failures need to be present in the diagnostic system.

In step 606, an initial set of modeling primitives or blocks is identified and the behavior for each block (that is, the relationship between the input and output) is defined. This behavior can be defined for different conditions as no-fault, faulty, or both. Starting with the wire, by way of example, the diagnostic system first models the wire in an operational (that is, OK) condition. Specifically, for this model the wire will be deemed to be in the OK state if the input to the wire is the same as the output. If a fault exists, such as a short or an open, then the input to the wire will not be same as the output for at least some conditions and a fault is deemed to be injected at the end of the wire regardless of the input state.

With respect to buses, the modeling is more complex. If a sub-system 106 is monitoring the bus (such as, by way of example, bus 214 in FIG. 2) for data activity, then the failure to detect data on the bus would be deemed to inject a fault. However, if the sub-system 106 is checking for data integrity or for a fault report transmitted from another sub-system 106, it is not possible to determine if the fault lies with the bus, the transmitting sub-system or the receiving sub-system.

Accordingly, the present invention provides CMC 102 visibility at both input and output ends of the bus. The model defines a receiver (or monitor) block and a transmitter (or generator) block so that it is possible to inject failure at both ends of the bus. Preferably, the receiver blocks include the capability of identifying different types of failures such as bus activity and data integrity. In one preferred mode, generic failure source block provides two inputs to the receiver and transmitter blocks. One input is connected to the actual data source, such as the bus. The other input is connected to a generic failure source block (or a logical combination of generic failure source blocks) so that any failure that can affect the sub-system may be injected at a single point. By way of example, a failure at a receiver would affect a specific receiver but a power failure would affect all receivers and transmitters.

A data integrity monitor can be incorporated into the receiver functions in the same way as the transmitter. The output of the failure receive block is the same as the input when the components are OK. Correspondingly, the components are faulty whenever the outputs and inputs are different. Since the bus activity monitor views an "inactive" state as an active failure, its behavior can be modeled as the inverse of the receiver block. If this monitor is OK and the bus connected to its input is "inactive" then its output is an "active" fault. If this monitor is OK and the bus connected to its input is "active" then its output is an "inactive" fault.

In general, the behavior of the logic and generic source blocks are defined with a set of Boolean rules as shown in Table 1 which sets forth the behavior for one preferred avionics modeling primitive set. It should be noted that only two states to represent data in the model are necessary: "active" to represent that a fault has occurred and "inactive" to represent that no fault has occurred.

In step 608, after the primitive blocks have been defined in step 606, a schematic representation is built such as shown in FIG. 2. Using this schematic representation, a dependency model is built such as shown in FIG. 4. This dependency model is a higher-level generic connectivity description of the system than may be obtained from Boolean equations or the causal network model. Although, the dependency model is not straightforward to understand or follow as the LRU interconnect and data flow diagram of FIG. 2. It is necessary to build this model to describe the actual behavior of system faults.

Once the behavior of the fault dependency model and the underlying primitives used in the model are accurate and understood, the user may elect to hide details by developing hierarchical levels of abstraction. As will be appreciated, in the casual network system model, complex systems are described as a number of interconnected sub-systems and each sub-sub-system is viewed as an interconnected set of primitives. Advantageously, since the present diagnostic system is based on a graphical description, selecting a

TABLE 1

| | | |
|---|---|---|
| Wire: | If wire is OK, & input (i) is active Then output (o) is active.<br>If wire is OK & i is inactive Then o is inactive.<br>If wire is faulty Then o is active. | 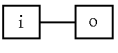 |
| Bus: | If bus is OK, & i is active Then o is active.<br>If wire is OK & i is inactive Then o is inactive.<br>If wire is faulty Then o is inactive. | 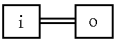 |
| Data integrity Receiver & Transmitter: | If failure input (f) is inactive & input (i2) is active Then o is active.<br>If f is inactive & i2 is inactive Then o is inactive.<br>If f is active & i2 is active Then o is inactive.<br>If f is active & i2 is inactive Then o is active. |  |
| Bus Activity Receiver and Transmitter: | If failure (f) is inactive & input (i2) is active Then o is inactive.<br>If f is inactive & i2 is inactive Then o is active.<br>If f is active & i2 is active Then o is active.<br>If f is active & i2 is inactive Then o is inactive. | Note:<br>Receiver<br>followed<br>by<br>inverter |
| Failure source: | If no failure Then o is inactive<br>If failure Then o is active |  |
| CMC fault report | If communication path is OK & i is active Then o is active.<br>If communication path is OK & i is inactive Then o is inactive.<br>If communication path is faulty Then o is no data. |  |
| FDE: | If i & o are active Then FDE is correlated. |  |
| AND gate: | If all inputs (i1 and i2) are active Then o is active<br>If i1 or i2 is inactive Then o is inactive |  |
| OR gate: | If i1 or i2 is active Then o is active<br>If i1 or i2 are inactive Then o is inactive |  |
| NOT gate (inverter): | If i is active Then o is inactive<br>If i is inactive Then o is active | 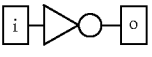 |
| XOR gate: | If i1 and i2 is are the same (active or inactive) Then o is inactive<br>If i1 and i2 are not the same Then o is active | 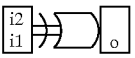 | specific LRU enables viewing of the monitors and generators attached to corresponding ports of the LRU. These monitors and generators are in turn connected to specific buses or wires at the system level. Deeper levels may be viewed by selecting the ports or monitors to display the receivers, transmitters and associated failure sources or the components that make up the monitor as described above.

In step 610 detailed simulation for model testing and validation is performed. The causal network diagnostic model operates on a static-input-variable-state snapshot to produce a diagnostic output. This process can be performed either through a manual mode or by executing simulation script files that specify the timing constraints for individual modeling components. In the manual mode, failure sources can be selected to change their states so as to simulate the rippling effect of a failure source through avionics system 100. Thus, system level evaluation for multiple system states and diagnostic outputs is possible in a short period of time. For the simulation script method, an input/output (I/O) shell simulator is used to simulate inputs into the model domain and control the timing relationships. It is the simulator shell's job to activate the diagnostic process when an appropriate system state has been reached. Activation of the diagnostics is therefore event-driven.

The simulation I/O shell runs the simulation script and performs required temporal record keeping based on the parameters specified in the script. When the simulation system moves from a quiescent (i.e., fault free) state to a period of failure activity, a fault cascade/consolidation period is begun according to the parameter set for the initiating input fault. At the end of this period (specified in simulation steps), the shell runs the CNETS diagnostic process on the model given its current state of input variables.

The user has the option of running any script straight through from beginning to end or to walk through the simulation step by step. At each step of the simulation, activity state changes for all fault reports and flight deck effects (FDE) are indicated by color changes in the fault report or FDE primitives on a display device (not shown) associated with the off-line system of FIG. 3. Thus, it is possible to provide an animation of the process of instantiating faults and propagating faults throughout the system model as the simulation proceeds. The user can select different views of the data such that in a "cascade" view all elements in a cascade chain are highlighted. Alternatively, an ambiguity group view can be selected such that all components in the current ambiguity group (i.e., a summary of all possible diagnostic explanations for the current state) are highlighted. By examining the connectivity between the components that make up this ambiguity group, an ambiguity group can be viewed as all failure sources, wires and buses that feed into a monitor block. Since this connectivity is included in the model, the model can be queried to indicate the next best test or position to execute or probe in order to reduce the ambiguity group. These tests can be defined for each component or failure. A cost based on time to test, cost to test, or some other parameter can be associated with every test so that the tests could be ranked by selected criteria such as least time or cost.

The diagnostic computation incorporates cascade effect removal, fault isolation, fault consolidation and FDE correlation into one consistent model, which are inherent properties of a causal network model. Once a model has been constructed, the diagnostic algorithms of CNETS automatically perform all of these functions in a single diagnostic process. It is also possible to highlight the portions of a model that relate to these functions. The causal network model approach integrates these tasks together rather than requiring sequential execution of the separate tasks such as required in prior art systems such as used with the Boeing 747-400 rule-based diagnostics and the Boeing 777 model-based diagnostics. This feature is extremely valuable for verifying model behavior and correctness.

It will be appreciated that the models generated by the present invention are easy to understand, develop and maintain because it uses the same functional and causal relationships that are familiar to the system engineer. This approach is localized and modular in that each sub-system need only be concerned with its immediate inputs and outputs. There is no need to know the origin of the inputs or how the outputs affect other sub-systems downstream. Further, local regions of the model can be modified by either adding or removing sub-systems without having to worry about the global effects on the overall system or the rule set.

Figure 7:
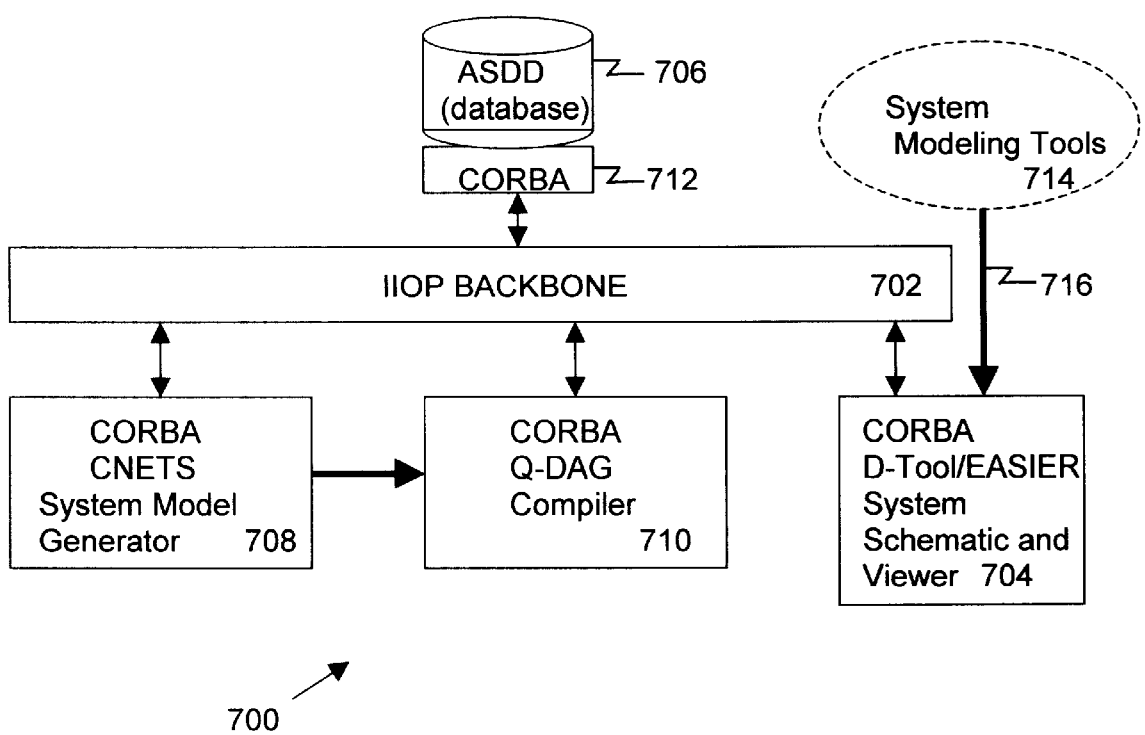
FIG. 7 is another exemplary diagnostic system for employing the computer-implemented method of the present invention for implementing a diagnostic system using Q-DAG models to identify system failures
Figure 8:
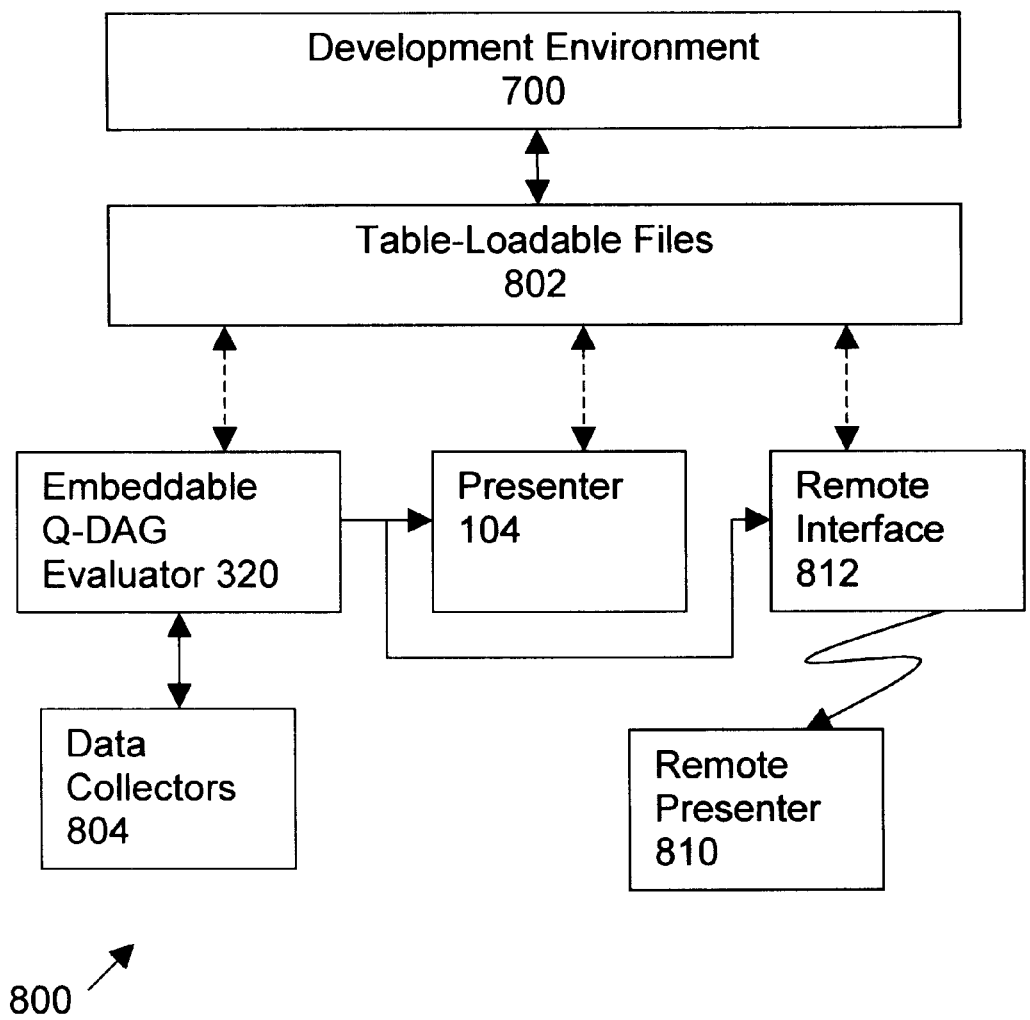
FIG. 8 illustrates one embodiment of the on-board diagnostic system for using Q-DAG models to identify system failures.

Referring now to FIGS. 7 and 8, the present invention is shown having a distributed architecture. In keeping with the distributed nature of the present embodiment of the invention, design functions, normally provided as an integrated package, are separated. Thus, data collection, presentation, model building and database storage are provided as separate functions. This distributed architecture relies on object-oriented software components that may be freely distributed across various computer platforms.

In this distributed environment, a software module, Object Request Broker (ORB), is responsible for brokering and communicating objects throughout the network. One preferred ORB, the Inter-Language Unification (ILU), available from Xerox PARC in Palo Alto, Calif., supports a large number of language mappings (e.g., Lisp, C/C++, Python, Java etc.) and processor platform implementation (e.g., Windows, Sparc, UNIX). In the embodiments of FIG. 7 and 8, a Common Object Request Broker Architecture (Corba) is utilized as the communication standard responsible for brokering and communicating objects throughout the network. Corba is used in conjunction with an Internet Inter-ORB Protocol (IIOP) standard to ensure interoperability over TCP/IP or Ethernet communication networks. IIOP is a transport alternative that incorporates an object-oriented communication paradigm in a manner similar to that of the well-known HyperText Transfer Protocol (HTTP). The Corba/IIOP approach allows an ORB from one manufacturer to have full interaction with an ORB from another manufacturer without special programming effort. Accordingly, the exchange of data between tools, from a variety of third party vendors, is readily provided by the diagnostic system of the present invention.

FIG. 7 illustrates one preferred embodiment of an off-line diagnostic system in accordance with the present invention. This embodiment of diagnostic system 700 includes an IIOP communication backbone 702. Coupled to IIOP communication backbone 702 is a schematic capture and viewer system 704, a database 706, a CNETS system model generator 708 and a Q-DAG compiler 710. System 704, generator 708 and compiler 710 share the common database environment for data capture for design, diagnostics, reliability, system engineering, etc. so that upgrades to avionics system 100 are readily propagated throughout diagnostic system 700. Transfer of data over the IIOP communication backbone 702 is enabled by associating a CORBA interface, such as indicated at 712, with each element of diagnostic system 700.

Database 706 stores system level data (such as, models, libraries, history logs of system revisions) that is accessed by system schematic capture and viewer system 704. Database 706 in one preferred embodiment is an object oriented database that captures, manages and reuses system information such as interface control documents, data dictionaries, physical connections, wiring diagrams, behavioral characteristics, etc. The single common repository provided by database 706 enables a single controlled source for configuration management, version control and model synchronization. One such database is the Avionics System Design Database (ASDD), available from Rockwell Collins of Cedar Rapids, Iowa, one of the assignees of the present invention.

With the single database environment for all design tools, the present invention avoids the necessity of implementing sophisticated mechanisms to ensure that a schematic or model change is automatically reflected in the data used by all other tools in the development or upgrade of avionics system 100.

It will be appreciated that the user will have different views into the data stored on database 706 depending on the schematic capture and viewer system 704 employed by the user. For diagnostic purposes, the preferred graphical viewer is the Enhanced Analysis and Simulation Integrated Environment from Rockwell (EASIER) also available from Rockwell International. EASIER enables the development of hierarchical models and provides the graphical interface between the block diagram system model and the causal network (CNETS and Q-DAGs) models used for diagnostics and simulation. EASIER also serves as a translator for importing and exporting models from system modeling tools 714. The preferred enabling technology for exchange of data between EASIER and system modeling tools 714 is in accordance with the CDIF specification. Data exchange may be over a direct link 716 or via the IIOP communication backbone 702.

Once schematic capture and viewer system 704 and CNETS system modeler 708 develop the causal network model for the avionics system, a compiled Q-DAG model of the avionics system is generated. More specifically, CNETS applies the belief inferences and generates a Q-DAG model.

This Q-DAG model is transferred to compiler 710. Diagnostic output is passed from compiler 710 to either display 112 (FIG. 1) and/or schematic capture and viewer system 704 for further simulation. The Q-DAG compiler 710 generates a set of table-loadable files (representing the Q-DAG model) to be transferred to real-time, on-board components of diagnostic system 800. These files are certified to comply with governmental or manufacturer specification for use on-board an aircraft.

Each of the components shown in FIG. 7 includes a CORBA interface 712 to allow for distribution of the components of diagnostic system 700 over the network.

Referring now to FIG. 8, one preferred embodiment of an embedded or on-board diagnostic system 800 is shown. More specifically, the diagnostic system 800 comprises three separate distributed components. A first component is a data collector 804 that is a front-end processor for monitoring bus activity on system bus 108 (see FIG. 1) and sampling the plurality of sensors associated with subsystems 106 (see FIG. 1). Data collector 804 performs filtering functions such as persistency or signal de-bouncing on the input data obtained from the system sensors. It also conditions analog sensor inputs providing corresponding discrete value outputs. Data collector 804 then passes state changes such as fault reports, FDEs, or other status information to a diagnostic engine or Q-DAG evaluator 320, the second component of system 800.

Table-loadable files (i.e., the compiled Q-DAG model) generated by diagnostic system 700 are passed to evaluator 320 over a communication link, indicated by dashed lines 803, such as Internet or a similar distributed network configuration. Evaluator 320 uses these Q-DAG files to evaluate sensor derived state variables provided by data collector 804 to determine if an error in the avionics system exists. If an error is detected, the state variables are filtered through evaluator 320 to generate a diagnostic inference or conclusion as to the source of the error. Evaluator 320 also updates the compiled Q-DAG model based on the state changes obtained from data collector 804 and generates a diagnostic report of the current state of avionics system 100 on a either a continuous or periodic basis. Based on the results obtained by evaluator 320, the avionics system model is displayed on the third component, presenter 104 or remote presenter 810. Since table-loadable presentation views (i.e., schematic data) are passed to the presenter 104 and presenter 810 from diagnostic system 700, the presenters display a graphical representation of the system. When presenter 104 and presenter 810 receive results from evaluator 320, the hierarchical system level schematic description of avionics system 100 graphically correlates failure combinations or ambiguity groups with sub-systems 106 or specific LRUs. If an error has been detected, the presenters show the error source as determined by evaluator 320 together with the cascade effect such error will have throughout the avionics system. These results may be communicated, either automatically or on demand, to presenter 104 and/or presenter 810. The presenters display the ambiguity group(s) or possible failure combinations, if any, to the user or more specifically the flight or maintenance crew. This distributed environment allows for multiple data collectors 804, evaluators 320, presenters 104 and/or remote presenters 810. These components communicate over a network communication means 808, such as an Ethernet network using the CORBA/IIOP interface.

The distributed diagnostic system shown in FIG. 8 further includes an interface 812 that provides a satellite link for data telemetry to remote presenter 810. Interface 812 connects presenter 810 to the on-board system. Interface 812 provides a viewer at a remote location the ability to monitor the state of the avionics system in real time. Advantageously, this interface 812 enables the remote presenter 810 to diagnosis faulty sub-systems at a ground-based facility while the aircraft is still in the air. Based on the diagnoses, remotely located maintenance crews may minimize repair time upon arrival of the aircraft by having replacement LRUs available.

Figure 9:
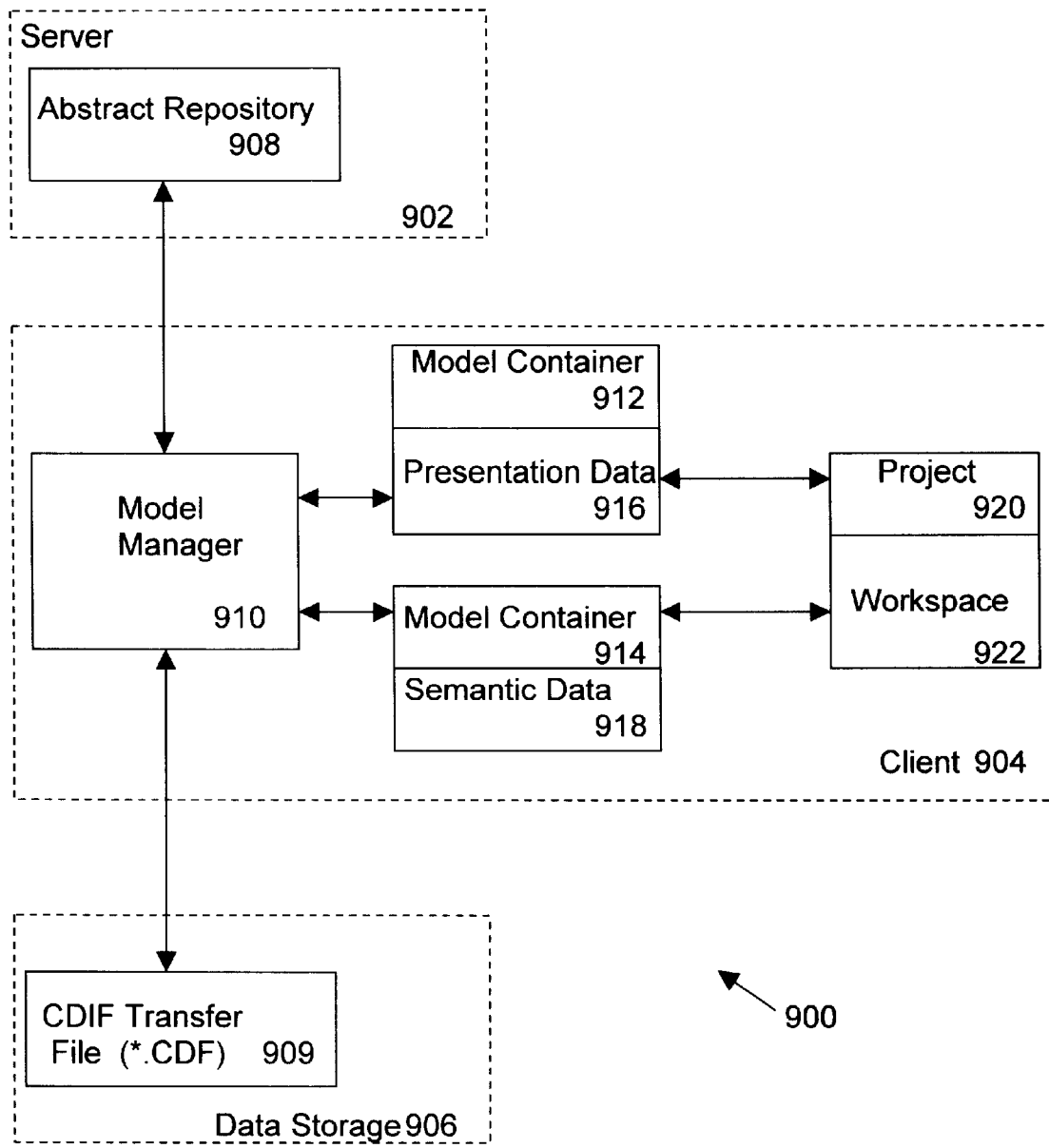
FIG. 9 illustrates the architecture of one preferred graphical viewer.

FIG. 9 illustrates the architecture of one preferred graphical viewer. The EASIER graphical viewer 900 comprises a server 902, a client 904 and a data storage object 906. Server 902 comprises at least one abstract repository 908. Abstract repository 908 can be selected at runtime to store and retrieve models from various locations such as a CDIF server with binary files (or other file types) or an ASDD server with an ASDD file. CDIF transfer agent 909 handles file transfer to or from storage.

Client 904 includes a model manager 910 that interfaces between server 902 and transfer agent 909 for data storage object 906 by handling data transfers such as storage, retrieval requests as well as data import and export. Model manager 910 also interfaces with model containers 912 and 914. Model container 912 includes presentation data as represented at 916 while model container 914 includes semantic data as represented at 918. Each model container 912 and 914 handles edit commands such as create, dispose, associate and disconnect.

As models are developed, model manager 910 transfers the necessary files to either of model containers 912 or 914. A project manager 920 maintains references to the current model containers 912 and 914 and manages all storage and retrieval. Models are stored as two separate parts, schematic data, which is the connectivity information and presentation data, which is the screen layout information. If presentation data is not available, project manager 920 uses an automatic layout object to generate one based on semantic data using workspace 922. Schematic data for a model can be transferred to CNETS 310 (FIG. 3) for generation of the Q-DAG model.

Project manager 920 controls user requests flow through client 904. User interface is provided by pull down menus, which in the preferred mode, are standard Java 1.1 menus that call methods. The EASIER Frame (not shown), which may either be called as a stand-alone application or spawned as an applet, is the main frame of the EASIER application. Project manager 920 can send or receive commands from any number of Java beans docked into this frame. These Java beans can be used for navigation, presentation and editing models. Client 904 is programmed in the JAVA language for maximum portability between different computing platforms like the desktop development environment and the on-board platform.

FIG. 10 shows the various components of EASIER, all of which are jar files. Jar files may contain data or software code (that is, computer instructions). CDIFStubs jar 1010 contains the CORBA stubs generated from the CDIF.IDL file. The stubs are generated using VisiBroker commercially available from Borland International, of Scotts Valley, Calif. CDIFCore jar 1012 sits on top of CDIFStubs jar 1010 and contains a set of objects that enhance the standard CDIFStubs for avionics applications. Model manager 910 resides in CDIFCore jar 1012 and is defined that is used to store and retrieve models into a selected abstract repository 908 (FIG. 9). Once a model is retrieved it is retained in model container 912 and 914 so that changes can be made. Macro functions may also be provided in CDIFCore jar 1012 to improve model development speed. CDIFServ jar 1014 contains an implementation of the CDIFStubs and is used to hold a CDIF model in memory of the off-line development system (such as shown in FIG. 7).

All objects and functionality relating to causal networks belong in the CausalNets jar 1016. This jar has data files for reusable logic blocks and for themes. This jar builds upon CDIFCore jar 1012 and CDIFStubs jar 1010. The logic blocks are stored as CDIF transfer files in the preferred embodiment. The theme contains both polygon and color information. Connection to the CNETS 310 (FIG. 3), CNETS system model generator 708 (FIG. 7) is achieved using CORBA and the CNETS.IDL interface. Data structures for holding transient state information is also present in this jar.

Functions relating to two-dimensional graphics, linear algebra, beans and GUI components such as dockable tools are retained in the Applesauce jar 1018. In this manner, EASIER meets the design criteria of being able to run under Java 1.1.x even though Java does not provide these functions. The EASIER shell 1020 is the top level coding that provides remaining functionality such as help files, splash screens, pull down menus or other such functionality.

Although more efficient (in terms of memory requirements) than a causal network model and the CNETS evaluation software, the raw Q-DAG model produced by CNETS can be memory intensive. For certain complex avionics systems, the raw Q-DAG can be very large and may exceed the requirements of the application both in terms of specificity of diagnoses and memory storage requirements. As will be appreciated, relaxing simulation and diagnostic completeness can significantly reduce the storage requirements of the Q-DAG while maintaining the effectiveness of the present invention.

Based on the above description, it should be clear that the present invention is suitable for many applications in addition to avionics systems. For example, the present invention may be readily adapted to factory automation applications, automobiles or other vehicles such as trucks, trains or buses. The above description is not intended to be limiting in terms of appropriate applications.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. In an avionics system having a plurality of interrelated sub-systems, a diagnostic system for diagnosing a failing sub-system, said diagnostic system comprising:

a communication network incorporating an object oriented communication paradigm for transmitting objects;

a data collector, coupled to said sub-systems and to said communication network, for deriving state variables representative of the operation of said sub-systems;

an evaluator, coupled to said communication network for receiving said state variables, having a set of query directed acyclic graph files associated therewith, said evaluator adapted to access said files to generate a diagnostic inference in response to erroneous operation of at least one of said sub-systems as represented by said state variables; and a presenter, coupled said communication network, for combining said inference from said evaluator with a schematic representation of said avionic system to graphically identify at least one sub-system causing said erroneous operation.

2. The diagnostic system of claim 1 wherein said network communication means further comprising an object request broker for transferring objects.

3. The diagnostic system of claim 2 further comprising at least one additional presenter for displaying said diagnostic inference, said at least one additional presenter coupled to evaluator and said database by said communications network.

4. The diagnostic system of claim 1 further comprising:

means for building a schematic model of said avionics system;

a causal network generator for receiving said schematic model and for generating a causal network system model; said causal network system model providing a ranked set of diagnoses for identifying failures of said avionics system;

a compiler for generating a compiled representation of said avionics system, said representation being an expression of possible diagnoses for said avionics system; and a database coupled to said schematic model building means, said causal network generator, said compiler and said communication network; said database having information describing said avionics system stored therein.

5. The causal network system model of claim 4 wherein said causal network system model is based on behavioral characteristics of said avionics system.

6. A diagnostic system for identifying faults in an electromechanical system comprising:

means for building a model-based description of said avionics system based on normal operating modes and potential failure modes of said avionics system;

a database for storing said model-based description;

means for acquiring state variables of said system and for determining an inference regarding the source of a fault in said system;

means for displaying a graphical representation of said system together with a fault indication;

communication network for coupling said building means, said acquiring means and said displaying means to said database, said communications network using the Internet Inter-ORB Protocol; and a CORBA interface, associated with said model building means, said database, said acquiring means and said display means, for brokering and communicating objects over said communications network.

7. The diagnostic system of claim 6 wherein said means for building a model-based description of said system further comprises:

means for developing a schematic model of said system, said schematic developing means comprising a plurality of abstract model blocks and a Boolean rules set describing the behavior of said abstract model blocks; each of said abstract model blocks having a monitor and generator block associated therewith;

means for developing a causal network model from said schematic model, said causal network model defining behavioral operation of said abstract model blocks in terms of said Boolean rules set;

means for applying causal inference to said causal network model to develop a query directed acyclic graph model representing said system; and a compiler for compiling said query directed acyclic graph.

8. In an avionics system having a plurality of interrelated sub-systems, a method for diagnosing system faults comprising the steps of:

building a schematic model describing the interconnection of said sub-systems;

converting said schematic model to a causal network model describing normal functioning and faulty functioning of said avionics system;

converting said causal network model to a query directed acyclic graph (Q-DAG) representation of said causal network;

compiling said Q-DAG representation;

storing said compiled Q-DAG representation in a memory means associated with a computer, said computer electrically associated with said plurality of sub-systems;

monitoring observable variables of said avionics system in accordance with said compiled Q-DAG representation to correlate said observable variables with flight deck effects; and graphically identifying at least one faulty sub-system and the cascade effect caused by said faulty sub-system on said avionics system.

9. in an electro-mechanical system, a method for diagnosing electro-mechanical system faults comprising the steps of:

generating a compiled a query directed acyclic graph (Q-DAG) representation of said electro-mechanical system using said Q-DAG representation, diagnosing faults occurring in said electro-mechanical system based on a plurality of state inputs received from said electro-mechanical system;

transporting, via a communications network, a diagnostic inference of failures of said electro-mechanical system to a viewer;

combining said diagnostic inference with a schematic representation of said electro-mechanical system;

generating a graphical display, on said viewer, of said combined diagnostic inference and said electro-mechanical system.

10. The method of claim 9 wherein said generating step further includes the step of animating the propagation of faults through said electro-mechanical system.

11. The method of claim 9 wherein said generating step further comprises the step of graphically illustrating the cascade effect of said fault.

12. The method of claim 9 wherein said transporting step further includes the step of transferring objects over a communications network using the Internet Inter-ORB Protocol.

13. The method of claim 12 wherein said transporting step further includes the step of providing a communications standard for brokering and communicating objects over said communications network.

14. The method of claim 13 wherein said transporting step further includes the step of providing a CORBA interface for brokering and communicating objects over said communications network.

15. The method of claim 9 further including the step of storing said Q-DAG representation of said electro-mechanical system in a database.

16. The method of claim 15 further including the step of accessing said database to acquire said schematic representation of said electro-mechanical system prior to said combining step.

17. In an electrical system having a plurality of interrelated sub-systems, a diagnostic method comprising the steps of:

modeling said system;

generating a compiled representation of said system, said representation comprising a set of diagnostic inference algorithms based on causal networks;

generating diagnostic inferences, using said compiled representation of said system, in response to a detected state change;

transporting objects over a communications network using the Internet Inter-ORB Protocol, said objects comprising at least said diagnostic inference and said system model to a viewer; and graphically displaying said diagnostic inference on said viewer.

18. The diagnostic method of claim 17 wherein said transporting step further includes the step of providing a CORBA interface for brokering and communicating objects over said communications network.

19. The method of claim 18 further including the step of accessing a common database to acquire a schematic representation of said electro-mechanical system prior to said modeling step.

20. The method of claim 19 wherein said modeling step further comprises the step of selecting at least one of a plurality of primitives from a library of primitives to define the function of said electrical system, said selected primitive having both a generator and a monitor block associated therewith.

21. The method of claim 20 wherein said modeling step further comprises the step of defining the behavioral characteristics of said electrical system.

22. The method of claim 17 further comprising the steps of:

transmitting said diagnostic inference to a remote viewer; and combining said diagnostic inference with a schematic representation of said electro-mechanical system.

23. The method of claim 22 further including the step of accessing said database to acquire said schematic representation of said electro-mechanical system prior to said combining step.

24. An electro-mechanical system diagnostic system comprising a schematic capture and viewer system for developing a model of said electro-mechanical system;

a database for capturing and storing system information;

a system model generator, coupled to said database, for generating a causal network model of said electro-mechanical system; and a Q-DAG compiler, coupled to said database, for generating a set of table-loadable files representative of a Q-DAG model of said electro-mechanical system.

25. The diagnostic system of claim 24 further comprising a communication network for coupling said schematic capture and viewer system, said generator and said compiler with said database.

26. The diagnostic system of claim 25 wherein said communication network comprises an Internet Inter-ORB Protocol (IIOP) compliant communication network.

27. The diagnostic system of claim 26 further comprising a plurality of CORBA interface modules, each of said plurality of modules associated with said schematic capture and viewer system, said database, said generator and said compiler.

28. The diagnostic system of claim 27 further comprising:

means for acquiring state variables of said electro-mechanical system and for determining an inference regarding the source of a fault in said electro-mechanical system; and means for displaying a graphical representation of said electro-mechanical system together with a fault indication.

29. The diagnostic system of claim 28 wherein said display means comprises a graphical viewer, coupled to said communication network, for developing hierarchical models and for providing a graphical interface between system models generated by said schematic capture and said inference means.

30. The inference means of claim 29 further comprising:

a data collector for monitoring bus activity of said electro-mechanical system and for generating state changes representative of the state of said electro-mechanical system;

an evaluator for evaluating said state variables and generating a diagnostic inference upon detection of an error in the operation of said electro-mechanical system; and a presenter for graphically displaying a combined system level model of said electro-mechanical system.

* * * * *